(12) United States Patent
Testanero et al.

(10) Patent No.: US 9,544,026 B1
(45) Date of Patent: Jan. 10, 2017

(54) METHOD, SYSTEM AND APPARATUS FOR SELECTIVELY ACCESSING CONTENT AT A DEVICE USING A CASE FOR THAT DEVICE

(71) Applicant: Cellotape, Inc., Fremont, CA (US)

(72) Inventors: Nick Testanero, Torrington, CT (US); Larry Tadashi Ino, Santa Clara, CA (US)

(73) Assignee: CELLOTAPE, INC., Fremont, CA (US)

( * ) Notice: Subject to any disclaimer, the term of this patent is extended or adjusted under 35 U.S.C. 154(b) by 0 days.

(21) Appl. No.: 14/801,742

(22) Filed: Jul. 16, 2015

Related U.S. Application Data

(60) Provisional application No. 62/025,895, filed on Jul. 17, 2014, provisional application No. 62/145,419, filed on Apr. 9, 2015.

(51) Int. Cl.
*H04B 5/00* (2006.01)

(52) U.S. Cl.
CPC .................... *H04B 5/0062* (2013.01)

(58) Field of Classification Search
CPC ............ G06K 7/10366; G06K 7/10009; G06K 19/0723; G06K 7/10316; G06K 7/10356; G06K 7/0008; G06K 7/10128
USPC ........................................................ 340/10.1
See application file for complete search history.

(56) References Cited

U.S. PATENT DOCUMENTS

| | | | |
|---|---|---|---|
| 8,522,977 B1 | 9/2013 | Britt, Jr. | |
| 9,026,187 B2 * | 5/2015 | Huang | H05K 5/0086 455/41.1 |
| 9,048,665 B2 * | 6/2015 | Wojcik | H05K 5/0086 |
| 9,083,811 B2 * | 7/2015 | Sharma | G06F 1/1632 |
| 9,275,049 B2 * | 3/2016 | Del Toro | G06F 1/1628 |
| 2006/0017573 A1 | 1/2006 | Noguchi | |
| 2007/0034686 A1 | 2/2007 | Davis et al. | |
| 2008/0238610 A1 | 10/2008 | Rosenberg | |
| 2008/0316033 A1 | 12/2008 | Yoo et al. | |
| 2010/0019482 A1 | 1/2010 | Kumagai et al. | |
| 2011/0070828 A1 * | 3/2011 | Griffin | H04M 1/7253 455/41.1 |
| 2012/0075072 A1 | 3/2012 | Pappu | |
| 2013/0140358 A1 | 6/2013 | Graef et al. | |
| 2014/0113549 A1 | 4/2014 | Beg et al. | |

OTHER PUBLICATIONS

Compucorp, Compucorp & Monroe 300-Series Portable Calculators, 1999, http://www.classiccmp.org/calcmuseum/compucorp_portable.htm, 12 pages.

Final Office Action mailed Dec. 9, 2014, for U.S. Appl. No. 13/830,108, filed Mar. 14, 2013, Inventor: Nick Testanero, 10 Pages.

(Continued)

*Primary Examiner* — Mark Blouin
(74) *Attorney, Agent, or Firm* — Haverstock & Owens LLP

(57) ABSTRACT

A protective case comprises an activatable NFC tag coupled to the protective case. The NFC tag is activated by depressing a button and/or placing the NFC tag in an operational position where it can be read by the electronic device. While the NFC tag is inactive, the electronic device is able to read one or more additional NFC tags as normal. In some embodiments, when the NFC tag is activated it transmits a link to non-localized information to the device.

19 Claims, 2 Drawing Sheets

(56) References Cited

OTHER PUBLICATIONS

Non-Final Office Action mailed Sep. 18, 2014, for U.S. Appl. No. 13/830,108, filed Mar. 14, 2013, Inventor: Nick Testanero, 13 Pages.
Office Action mailed Apr. 1, 2015, for U.S. Appl. No. 13/673,674, filed Nov. 9, 2012, Inventor: Nick Testanero. 18 Pages.

* cited by examiner

METHOD, SYSTEM AND APPARATUS FOR SELECTIVELY ACCESSING CONTENT AT A DEVICE USING A CASE FOR THAT DEVICE

RELATED APPLICATIONS

This Patent Application claims priority under 35 U.S.C. 119(e) of the U.S. provisional patent Application No. 62/025,895, filed on Jul. 17, 2014, and entitled "SELECTIVELY ACTIVE NFC TAG", and the U.S. provisional patent Application No. 62/145,419, filed on Apr. 9, 2015, and entitled "ON-DEMAND NFC TAG", which are both hereby incorporated in its entirety by reference. The co-pending U.S. patent application Ser. No. 14/801,604, entitled METHOD, SYSTEM AND APPARATUS FOR SELECTIVELY ACCESSING CONTENT AT A DEVICE, is also both hereby incorporated by reference.

FIELD OF THE INVENTION

The present invention is generally directed to the field of near field communication (NFC) and NFC tags. More specifically, the present invention is directed to a method, system and apparatus for selectively accessing digital content at a device using a case in which the device is mounted.

BACKGROUND OF THE INVENTION

Many devices include a "reader" for NFC tags. Such devices include cell phones, tablet computers, and so-called phablets (phone-tablets). Such devices are often mounted in a case. NFC tags include an antenna, which is activated by the reader and produces a signal that interacts with the antenna.

In certain circumstances, an NFC tag can be affixed over the reader with an adhesive either to the outside of the device housing or to the inside of a case that is mounted to the device. Such circumstances can occur when the user of the device wants to have repeatable and ready access to the information stored on that NFC tag with the device. Unfortunately, whenever the NFC tag is mounted over the reader, the device is unable to read any other NFC tag.

SUMMARY OF THE INVENTION

A protective case comprises an activatable NFC tag coupled to or integrally formed in the protective case. The NFC tag is activated by depressing a button and/or placing the NFC tag in an operational position where it can be read by the electronic device. Preferably the button is a part of the case. While the NFC tag is inactive, the electronic device is able to read one or more additional NFC tags as normal. In some embodiments, when the NFC tag is activated it transmits a link for non-localized information to the device.

In one aspect, an apparatus for accessing content at an electronic device comprises an apparatus body for holding the device, an activatable NFC tag coupled to the apparatus body and an activator for activating a the NFC tag, wherein when the NFC tag is activated it is capable of transmitting information to the electronic device. In some embodiments, the apparatus body comprises plastic. The activator can comprise a button coupled to the apparatus body. In some embodiments, a circuit of the NFC tag is completed when the button is depressed. Alternatively, the activator closes a circuit to the NFC tag to be read by the NFC reader. The NFC tag can be programmable or preprogrammed. In some embodiments, the NFC tag is programmed with a link to non-localized information. Particularly, the electronic device is able to read one or more additional NFC tags while the NFC tag is not activated.

In another aspect, a system for selectively accessing content at a device, the system comprises a protective case for the device and an activatable NFC tag non-removably coupled to the protective case, wherein when the NFC tag is activated it transmits a link to non-localized information to the device. In some embodiments, the apparatus body comprises plastic. The activator can comprise a button coupled to or formed as part of the apparatus body. In some embodiments, a circuit of the NFC tag is completed when the button is depressed. Alternatively, the activator comprises a button which moves a blocking layer in order to expose the NFC tag to the NFC reader. The NFC tag can be programmable or preprogrammed. In some embodiments, the NFC tag is programmed with a link to non-localized information. Particularly, the electronic device is able to read one or more additional NFC tags while the NFC tag is not activated.

In a further aspect, a method of selectively accessing content at a device comprises coupling the device with a protective case and activating the an NFC tag coupled with the device, wherein when the NFC tag is activated it is operable to transmit information to the device. The electronic device is able to read one or more additional NFC tags while the NFC tag is not activated. The NFC tag can be programmable or preprogrammed.

DETAILED DESCRIPTION OF THE EMBODIMENTS

Embodiments of the invention are directed to a method, a system and an apparatus for accessing content at an electronic device. A protective case comprises an activatable NFC tag coupled to the protective case. The NFC tag is activated by depressing a button which causes the NFC tag to be operational position so that it can be read by the electronic device. While the NFC tag is inactive, the electronic device is able to read one or more additional NFC tags as normal. In some embodiments, when the NFC tag is activated it transmits a link to non-localized information to the device.

Reference will now be made in detail to implementations of a method, system, and apparatus for selectively accessing content at a device as described below and as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
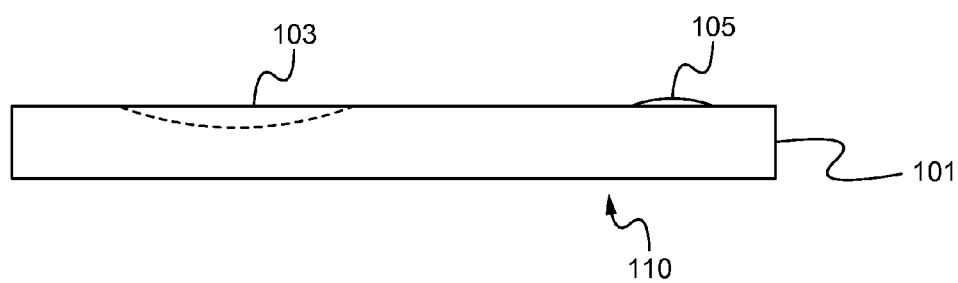
FIGS. 1 and 2 illustrate a case for an electronic device in accordance with some embodiments.

Referring now to FIG. 1, an apparatus for accessing content at a device is depicted therein. The apparatus as shown in FIG. 1 comprises a case for coupling with an electronic device comprising an NFC reader. The case 100 comprises a case body 101, an activatable NFC tag 103, a button and/or switch 105 for activating the NFC tag 103, and a cavity 110 for receiving the electronic device. When the NFC tag 103 is activated it is capable of transmitting information to an electronic device coupled with the case 100. In some embodiments, a circuit of the NFC tag 103 is completed when the button 105 is depressed such as described in the co-pending U.S. patent application Ser. No. 14/801,604, entitled METHOD, SYSTEM AND APPARATUS FOR SELECTIVELY ACCESSING CONTENT AT A DEVICE, which is hereby incorporated by reference. The electronic device is able to read one or more additional NFC tags while the NFC tag 103 is not activated.

In some embodiments, when the NFC tag 103 is activated, the NFC tag 103 transmits a set of instructions to the electronic device. Alternatively, in some embodiments, when the NFC tag 103 is activated, the NFC tag 103 invokes an application of the electronic device. Particularly, the NFC tag 103 can be programmed to transmit any appropriately desired information to the electronic device. For example, in some embodiments, the NFC tag 103 is programmed with a link to non-localized information stored remotely from the electronic device. For example, in some embodiments, the NFC tag 103 comprises a link to remotely stored photos, music, and/or videos desired to be accessed at the electronic device. Particularly, the case 100 allows a user to maintain ready access to information of an often accessed NFC tag while still being able to access information on other NFC tags.

In some embodiments, the case 100 comprises a protective case for the electronic device is manufactured from a material such as plastic. Particularly, the case 100 can comprises any appropriately desired protective features. Additionally, although the button 105 is shown on a back of the case body 101 and on an opposite side from the cavity 110, the button 105 can be placed at any desirable location on the case body 101. For example, in some embodiments, the button 105 is on a side of the case body 101.

Figure 2:
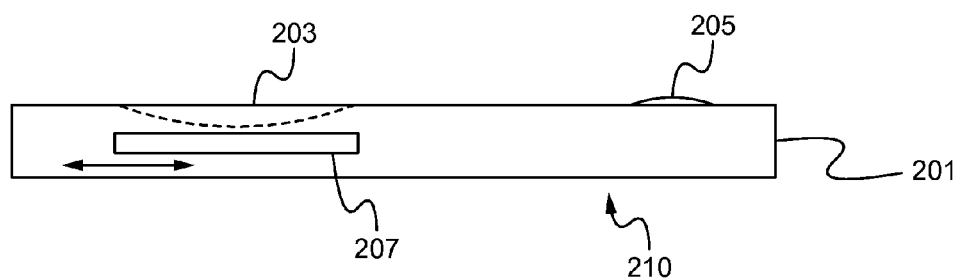

FIG. 2 illustrates an apparatus for accessing content at a device is depicted therein. The apparatus as shown in FIG. 2 is similar to the case 200 such as described above, and comprises a case for coupling with an electronic device comprising an NFC reader. The case 200 comprises a case body 202, an activatable NFC tag 203, a button and/or switch 205 for activating the NFC tag 203, and a cavity 210 for receiving the electronic device. When the NFC tag 203 is activated it is capable of transmitting information to an electronic device coupled with the case 200. In some embodiments, the button 205 moves a blocking layer 207 in order to expose the NFC tag 203 so that it can be read by the electronic device. Particularly, the button 205 is configured to move the blocking layer 207 in front of and away from the NFC tag 203. The NFC tag 203 is not operational and is not readable by the electronic device when it is blocked by the blocking layer 207. In some embodiments, the button 207 is configured to move the NFC tag 203 behind and away from the blocking layer 207. The electronic device is able to read one or more additional NFC tags while the NFC tag 203 is not operational.

In some embodiments, when the NFC tag 203 is activated, the NFC tag 203 transmits a set of instructions to the electronic device. Alternatively, in some embodiments, when the NFC tag 203 is activated, the NFC tag 203 invokes an application of the electronic device. Particularly, the NFC tag 203 can be programmed to transmit any appropriately desired information to the electronic device. For example, in some embodiments, the NFC tag 203 is programmed with a link to non-localized information stored remotely from the electronic device. For example, in some embodiments, the NFC tag 203 comprises a link to remotely stored photos, music, and/or videos desired to be accessed at the electronic device. Particularly, the case 200 allows a user to maintain ready access to information of an often accessed NFC tag while still being able to access information on other NFC tags.

As described in relation the case 100, above, in some embodiments, the case 200 comprises a protective case for the electronic device is manufactured from a material such as plastic. Particularly, the case 200 can comprises any appropriately desired protective features. Additionally, although the button 105 is shown on a back of the case body 101 and on an opposite side from the cavity 110, the button 105 can be placed at any desirable location on the case body 101. For example, in some embodiments, the button 105 is on a side of the case body 101.

Figure 3:
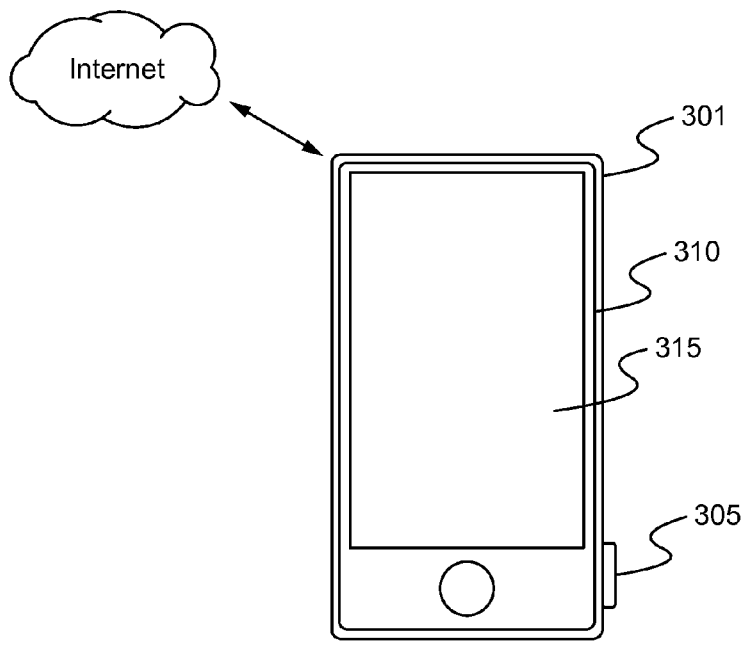
FIG. 3 illustrates a system for selectively accessing content at an electronic device in accordance with some embodiments.

FIG. 3 illustrates a system for selectively accessing content at a device in accordance with some embodiments. As shown within FIG. 3, an electronic device 315 has been coupled with the cavity 310 of the protective case 300. The protective case 300 is similar to the protective cases 100 and 200 as described above. The protective case 300 comprises a case body 301, an activatable NFC tag and a button and/or switch 305 for activating the NFC tag.

As described above, in some embodiments, when the NFC tag is activated, the NFC tag transmits data and/or a set of instructions to the electronic device. Alternatively, in some embodiments, when the NFC tag is activated, the NFC tag invokes an application of the electronic device. Particularly, the NFC tag can be programmed to transmit any appropriately desired information to the electronic device. For example, in some embodiments, the NFC tag 203 is programmed with a link to non-localized information stored from the electronic device. For example, in some embodiments, the NFC tag comprises a link to remotely stored photos, music, and/or videos desired to be accessed at the electronic device.

Figure 4:
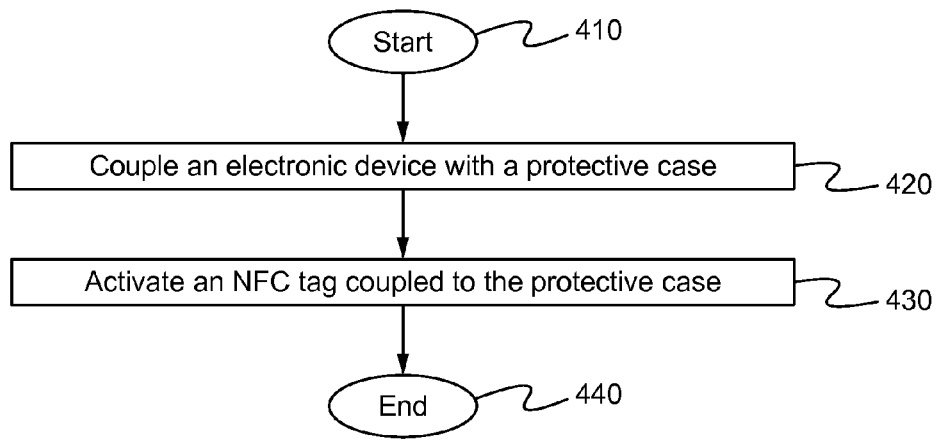
FIG. 4 illustrates a method of selectively accessing content at an electronic device in accordance with some embodiments.

FIG. 4 illustrates a method of selectively accessing content at an electronic device in accordance with some embodiments. The method begins in the step 410. In the step 420, an electronic device is coupled with a protective case comprising an activatable NFC tag. Then, in the step 430, the NFC is activated. As described above, when the NFC tag is activated, it is operable to transmit data to the electronic device. In some embodiments, a button and/or switch of the case is depressed in order to activate the NFC tag.

As described above, in some embodiments, when the NFC tag is activated, the NFC tag transmits a set of instructions to the electronic device. Alternatively, in some embodiments, when the NFC tag is activated, the NFC tag invokes an application of the electronic device. Particularly, the NFC tag can be programmed to transmit any appropriately desired information to the electronic device. For example, in some embodiments, the NFC tag 203 is programmed with a link to non-localized information stored from the electronic device. For example, in some embodiments, the NFC tag comprises a link to remotely stored photos, music, and/or videos desired to be accessed at the electronic device. The case allows a user to maintain ready access to information of an often accessed NFC tag while still being able to access information on other NFC tags.

In operation, a selectively activatable NFC tag is embedded within a protective case for an electronic device. While the NFC tag is disabled, the electronic device is able to read any other NFC tag as normal. Activating the disabled NFC tag enables it to be read by the electronic device and/or NFC reader. Consequently, an NFC tag containing convenient or repeatably accessible information can be stored near the electronic device while still allowing the electronic device to access information stored on other NFC tags. Particularly, the present invention allows a user to maintain ready access to information of an often accessed NFC tag while still being able to access information on other NFC tags. Accordingly, the present invention as described herein has many advantages.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. An apparatus for accessing content at an electronic device, the apparatus comprising:
 a. an apparatus body for holding the electronic device;
 b. an activatable NFC tag coupled to the apparatus body; and
 c. an activator for activating the NFC tag while the apparatus body is holding the electronic device, wherein when the NFC tag is activated it is capable of transmitting information to the electronic device.

2. The apparatus of claim 1, wherein the apparatus body comprises plastic.

3. The apparatus of claim 1, wherein the activator comprises a button coupled to the apparatus body.

4. The apparatus of claim 3, wherein a circuit of the NFC tag is completed when the button is depressed.

5. The apparatus of claim 1, wherein the activator comprises a button which moves a blocking layer in order to expose the NFC tag to the NFC reader.

6. The apparatus of claim 1, wherein the NFC tag is preprogrammed.

7. The apparatus of claim 6, wherein the NFC tag is programmed with a link to non-localized information.

8. The apparatus of claim 1, wherein the electronic device is able to read one or more additional NFC tags while the NFC tag is not activated.

9. A system for selectively accessing content at a device, the system comprising:
 a. a protective case that holds the device; and
 b. an activatable NFC tag non-removably coupled to the protective case, wherein when the NFC tag is activated it transmits a link to non-localized information to the device.

10. The system of claim 9, wherein the protective case comprises a plastic body.

11. The system of claim 9, wherein a button coupled to the case body activates the NFC tag.

12. The system of claim 11, wherein a circuit of the NFC tag is completed when the button is depressed.

13. The system of claim 11, wherein the button moves a blocking layer in order to expose the NFC tag to the NFC reader.

14. The system of claim 9, wherein the NFC tag is preprogrammed.

15. The system of claim 9, wherein the electronic device is able to read one or more additional NFC tags while the NFC tag is not activated.

16. A method of selectively accessing content at a device, the method comprising:
 a. coupling the device with a protective case; and
 b. while the device is coupled with the protective case, activating an NFC tag coupled with the case, wherein when the NFC tag is activated it is operable to transmit information to the device.

17. The method of claim 16, wherein the electronic device is able to read one or more additional NFC tags while the NEC tag is not activated.

18. The method of claim 16, wherein the NFC tag is preprogrammed.

19. A case for a cell phone, wherein the cell phone includes a reader for NFC tags, the case including:
 a. an activatable NFC tag located in a position to be read by the reader when the case is mounted to the cell phone; and
 b. a switch to activate the NFC tag, such that the reader will read the activatable tag when the switch is activated and any other tag that is positioned adjacent the reader when the switch is not activated.

* * * * *